Oct. 8, 1963   R. W. KREKEL   3,105,978
COMB FOUNDATION
Filed July 31, 1961

United States Patent Office 3,105,978
Patented Oct. 8, 1963

3,105,978
COMB FOUNDATION
Richard W. Krekel, Hamilton, Ill., assignor to Dadant & Sons, Inc., Hamilton, Ill., a company of Illinois
Filed July 31, 1961, Ser. No. 127,892
2 Claims. (Cl. 6—11)

This invention generally relates to an improved comb foundation for use in beehives. In particular, this invention relates to a novel type of synthetic plastic comb foundation for use in beehives.

As is well known, bee keepers provide their bees with foundations upon which the bees build honey combs. The most common type of foundation is one made with beeswax and reinforced with wires. Bees readily accept such foundations but they suffer from a number of disadvantages including expense, poor strength during handling and hauling operations, poor rigidity, tendency to sag or melt under excessive heat conditions, the tendency of bees to gnaw and chew them, the tendency of bees to change the size of the cells so as to produce drone bees, the tendency to curl, etc.

For more than 40 years attempts have been made to find a suitable substitute for foundations made of beeswax. Among such substitutes may be listed foundations made of paper, cloth, "cellophane," fibrous material, metallic strips, glass, aluminum, Bakelite, Celluloid, polyethylene, etc. The fact that the bulk of the foundations now being sold are still made of beeswax is ample evidence that these substitutes suffer from one or more serious disadvantages which make them unacceptable in the bee world. One of the most common disadvantages encountered with these foundation substitutes is that bees accept them only under very favorable conditions and reject them when comb building conditions are not highly favorable.

With specific reference to these prior art foundations, it is probably worth reporting here as to the results of some tests which I made with a foundation constructed of ordinary polystyrene and which was commercially available some time ago. While this foundation made of ordinary polystyrene did have a number of desirable properties as compared with foundations made of beeswax, it was found that bees actually rejected it when the over-all conditions for comb building were not highly favorable. Frequent or even infrequent rejection of a comb foundation by the bees is of course highly undesirable since it means not only a loss in honey yield but sometimes even a loss of the bees themselves.

It is therefore an object of this invention to produce a bee comb foundation which overcomes the aforementioned disadvantages of foundations made of either beeswax or the prior art substitutes for beeswax.

Figure 1:
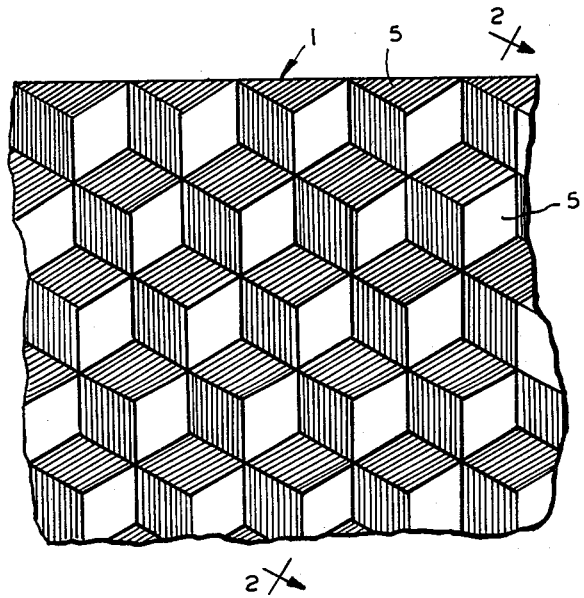
FIGURE 1 is an enlarged main face view of a fragment of a comb foundation made in accordance with this invention.
Figure 2:
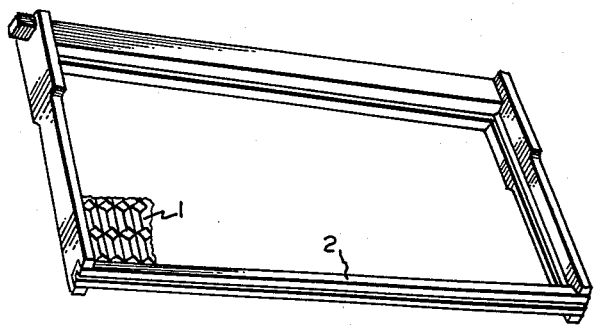
FIGURE 2 is a perspective view of a frame and foundation in accordance with this invention.

Referring to FIGURE 1, the illustrated fragment of a foundation has a uniform pattern of hollow triangular pyramids struck alternately toward opposite sides, the hexagonal areas 5 being partly raised and partly depressed with reference to the principal plane of the sheet. FIGURE 2 indicates how such a foundation would be enclosed within a wooden frame 2.

I have discovered that a vastly superior bee comb foundation can be produced from sheets of oriented polystyrene coated with beeswax. This discovery was highly unexpected in view of my prior observations that comb foundations made from ordinary (unoriented) polystyrene result in a product which the bees rejected when the conditions for comb building were not highly favorable. In contrast to ordinary polystyrene, oriented polystyrene results in a foundation which is always readily accepted by bees.

Oriented polystyrene is produuced by a number of companies such as The Dow Chemical Company, Plax Corporation, Visking Company, etc. Oriented polystyrene and its properties are described in many publications such as The Modern Plastics Encyclopedia, vol. 38, No. 1A, September 1960. Orientation is accomplished by extruding the ordinary polystyrene and then stretching longitudinally and laterally under carefully controlled temperature conditions. In the process of orientation, the molecules are mechanically rearranged from a random to an orderly structure, greatly increasing the strength in the directions of stretch. The sheet in this condition has an "elastic memory" and if heated to the distortion point (185–200° F.) will revert to the dimension of the earlier unoriented state. The thickness for my oriented polystyrene sheet is largely critical and should fall within the range of about 5.0 mils to 13.0 mils. The tensile strength of the oriented polystyrene which is preferred in accordance with this invention ranges between about 8,000 and 12,000 pounds per square inch.

The oriented polystyrene base foundation in accordance with this invention is preferably translucent. When such an oriented polystyrene sheet is coated on boh sides with beeswax and embossed with the configuration of the cell base of the worker bee, the plastic becomes "lost" or "disappears" in the finished foundation. The bees accept my foundation as readily as a comb foundation made entirely of beeswax (and sometimes even more readily). Oriented polystyrene remains flexible over a temperature range of −40° F. to +180° F. and is dimensionally stable over a wide range of temperatures and humidities.

In producing the finished product of the present invention, the oriented polystyrene sheet is passed through coating equipment which coats it on each side with a layer of beeswax. The thickness of each layer is critical and should fall within the range from about 5.0 to 13 mils. Within this range a layer thicknes of 10 mils is preferred. The beeswax coating is preferably applied at a temperature of approximately 170° F. The coated sheet is then passed through embossing rollers and cut to the desired length and width. I have discovered that oriented polystyrene sheet is one of a very few plastic sheets which can be shaped in this manner and which will hold its shape indefinitely after processing.

The bee comb foundation in accordance with this invention (made of oriented polystyrene coated with beeswax) has the following advantageous properties:

(1) All types of honey bees "accept" this foundation as readily and as willingly as they accept comb foundations made with pure beeswax,
(2) Bees readily construct comb on it and quickly use it for storage of honey or brood rearing,
(3) It has great strength under a wide variety of handling and hauling conditions and is very difficult to damage,
(4) It has superior rigidity so that it won't sag or be distorted during the excessive heat of summer,
(5) Bees cannot gnaw, chew or otherwise affect it and are thus unable to change the polyhedral cell pattern, thus assuring the production of cells of worker size rather than cells of drone size,
(6) It has a natural tendency to lie flat and straight,
(7) It is inexpensive (it is even less expensive than combs made of beeswax, aluminum foil or other plastics),
(8) It can be easily mass produced.

When a comb foundation (made of something other than beeswax) in a frame becomes old, broken, or caked with excessive amounts of beeswax, the beekeeper desires to place a new foundation in the frame, but before doing so it is economically worthwhile for him to recover the beeswax adhering to the frame and comb foundation. This recovery of beeswax is most usually accomplished by immersing the entire frame and foundation in a vat of boiling water. The hot boiling water will melt the beeswax in due course, which rises to the surface of the boiling water where it can be collected and subsequently marketed. The beekeeper usually must still remove the comb foundation from the frame (except when the foundation is made of a sturdy material such as aluminum) which involves more or less manual labor depending upon whether the comb foundation has been nailed to the frame or merely wedged therein. The product of the present invention offers several unexpected advantages insofar as this process of immersing in boiling water is concerned. In particular, when comb foundations made of oriented polystyrene are immersed in boiling water, the oriented polystyrene rapidly shrinks in size, curls and pulls itself out of the frame. The rapid shrinking and curling causes the beeswax adhering to the comb foundation to separate completely. In contrast, a frame containing a polyethylene comb foundation remains fast in the frame during immersion in boiling water and the beeswax clings to it more readily.

The invention involves the chemical composition of the bee comb foundation rather than its physical configuration. The physical shape and configuration of my foundation is conventional, consisting of a uniform pattern of hollow triangular pyramids struck alternately toward opposite sides, with hexagonal areas which are partly raised and partly depressed with reference to the principal plane of the sheet. Every comb foundation is constructed in this same way. The pyramids preferably have ribs at their hexagonal boundaries or ridge definitions for the purpose of assisting the bees in starting the comb cells.

What is claimed is:

1. An improved comb foundation comprising a sheet of oriented polystyrene having a thickness between about 5.0 and 13 mils, said sheet being coated on its upper surface with a layer of beeswax between about 5 and 13 mils thick and also coated on its lower surface with a layer of beeswax between about 5 and 13 mils thick, the entire foundation being embossed with a uniform pattern of hollow triangular pyramids struck alternately toward opposite sides, with hexagonal areas which are partly raised and partly depressed with reference to the principal plane of the sheet.

2. A comb foundation according to claim 1 wherein each of said beeswax layers is 10 mils thick.

References Cited in the file of this patent
UNITED STATES PATENTS

| | | |
|---|---|---|
| 1,672,853 | Settle | June 5, 1928 |
| 1,882,938 | Root | Oct. 18, 1932 |
| 2,561,147 | Smith | July 17, 1951 |